United States Patent [19]

Longacre, Jr. et al.

[11] Patent Number: 5,591,956
[45] Date of Patent: Jan. 7, 1997

[54] TWO DIMENSIONAL DATA ENCODING STRUCTURE AND SYMBOLOGY FOR USE WITH OPTICAL READERS

[75] Inventors: Andrew Longacre, Jr., Skaneateles; Rob Hussey, Liverpool, both of N.Y.

[73] Assignee: Welch Allyn, Inc., Skaneateles Falls, N.Y.

[21] Appl. No.: 441,446

[22] Filed: May 15, 1995

[51] Int. Cl.$^6$ .................................................. G06K 7/10
[52] U.S. Cl. ........................................ 235/494; 235/462
[58] Field of Search ................................ 235/494, 462, 235/460, 456, 454, 470; 250/566, 568, 569; 382/44, 45, 46, 48

[56] References Cited

U.S. PATENT DOCUMENTS

| | | | |
|---|---|---|---|
| 3,074,634 | 1/1963 | Gamo | 235/462 |
| 3,513,320 | 10/1966 | Weldon | 233/50 |
| 3,603,728 | 9/1971 | Arimura | 340/146.3 |
| 4,286,146 | 8/1981 | Uno et al. | 235/456 |
| 4,488,679 | 12/1984 | Bockholt et al. | 235/469 |
| 4,634,850 | 1/1987 | Pierce et al. | 235/487 |
| 4,736,109 | 4/1988 | Dvorzsak | 235/494 |
| 4,794,239 | 12/1988 | Allais | 235/462 |
| 4,874,936 | 10/1989 | Chandler et al. | 235/494 |
| 4,896,029 | 1/1990 | Chandler et al. | 235/494 |
| 4,924,078 | 5/1990 | Sant'Anselmo et al. | 235/494 |
| 5,276,315 | 1/1994 | Surka | 235/494 X |
| 5,324,923 | 6/1994 | Cymbalski et al. | 235/494 X |
| 5,329,107 | 7/1994 | Priddy et al. | 235/494 |
| 5,416,311 | 5/1995 | Kyriazis | 235/494 |

FOREIGN PATENT DOCUMENTS

| | | | |
|---|---|---|---|
| 0278189 | 11/1988 | Japan | 235/494 |
| 5054214 | 3/1993 | Japan | 235/494 |
| 5-250501 | 9/1993 | Japan | 235/494 |
| 3002429 | 2/1993 | WIPO | 235/494 |

*Primary Examiner*—Donald T. Hajec
*Assistant Examiner*—Thien Minh Le
*Attorney, Agent, or Firm*—Harris Beach & Wilcox, LLP

[57] ABSTRACT

A two dimensional (2D) matrix symbology for use with bar code and other optical readers. A finder structure includes a center square and a plurality of nested squares having centers that approximately coincide with the center square. A symbol descriptor located adjacent to the finder structure encodes data indicating the size of the symbol and the length of the message encoded therein. A reference grid extends throughout the symbol to facilitate the location of individual data elements with respect to the finder structure thereof. The data structure of the symbol is filled with data blocks which are organized into layers which surround the finder structure. Data encoded in the data blocks may be read sequentially within layers and between layers. The symbology is a versatile symbology in that the number of check data blocks is user selectable to provide the desired level of error correction.

20 Claims, 4 Drawing Sheets

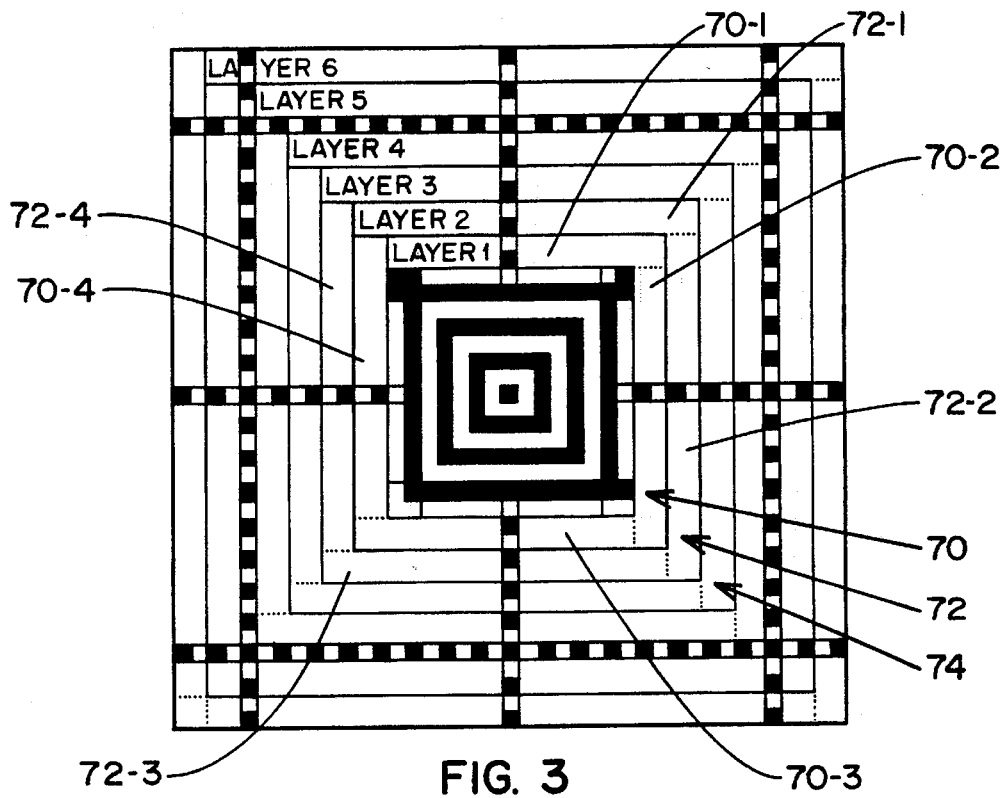
FIG. 3
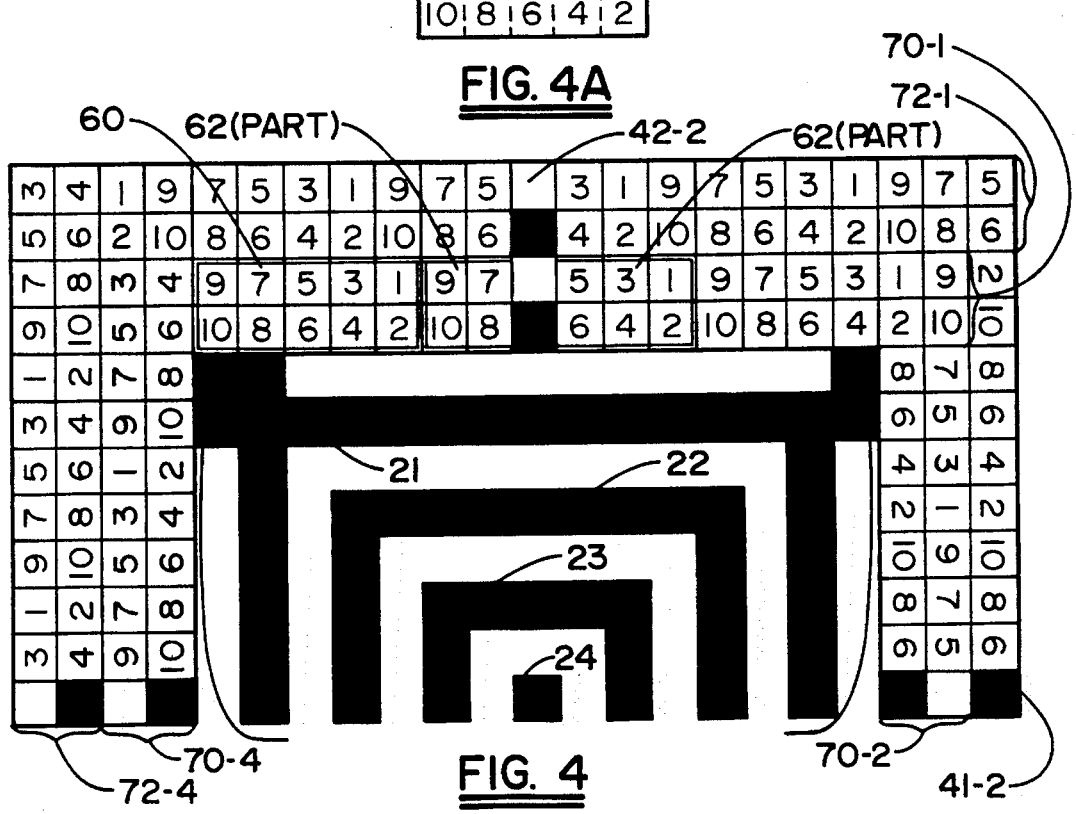
FIG. 4A
FIG. 4

| Value | UPPER Char | UPPER ASCII | LOWER Char | LOWER ASCII | STRING Char | STRING ASCII | PUNC. Char | PUNC. ASCII | DIGIT Char | DIGIT ASCII |
|---|---|---|---|---|---|---|---|---|---|---|
| 0 | A | 65 | a | 97 | CR LF | 13,10 | CR LF | 13,10 | 0 | 48 |
| 1 | B | 66 | b | 98 | . SP | 46,32 | . SP | 46,32 | 1 | 49 |
| 2 | C | 67 | c | 99 | , SP | 44,32 | , SP | 44,32 | 2 | 50 |
| 3 | D | 68 | d | 100 | : SP | 58,32 | : SP | 58,32 | 3 | 51 |
| 4 | E | 69 | e | 101 | ! | 33 | ! | 33 | 4 | 52 |
| 5 | F | 70 | f | 102 | " | 34 | " | 34 | 5 | 53 |
| 6 | G | 71 | g | 103 | # | 35 | # | 35 | 6 | 54 |
| 7 | H | 72 | h | 104 | $ | 36 | $ | 36 | 7 | 55 |
| 8 | I | 73 | i | 105 | % | 37 | % | 37 | 8 | 56 |
| 9 | J | 74 | j | 106 | & | 38 | & | 38 | 9 | 57 |
| 10 | K | 75 | k | 107 | ' | 39 | ' | 39 | SP | 32 |
| 11 | L | 76 | l | 108 | . | 46 | ( | 40 | , | 44 |
| 12 | M | 77 | m | 109 | : | 58 | ) | 41 | . | 46 |
| 13 | N | 78 | n | 110 | * | 42 | * | 42 | US | |
| 14 | O | 79 | o | 111 | + | 43 | + | 43 | UL | |
| 15 | P | 80 | p | 112 | , | 44 | , | 44 | PS | |
| 16 | Q | 81 | q | 113 | @ | 64 | - | 45 | | |
| 17 | R | 82 | r | 114 | \ | 92 | . | 46 | | |
| 18 | S | 83 | s | 115 | | 94 | / | 47 | | |
| 19 | T | 84 | t | 116 | | 95 | : | 58 | | |
| 20 | U | 85 | u | 117 | | 96 | ; | 59 | | |
| 21 | V | 86 | v | 118 | { | 123 | < | 60 | | |
| 22 | W | 87 | w | 119 | | | 124 | = | 61 | | |
| 23 | X | 88 | x | 120 | } | 125 | > | 62 | | |
| 24 | Y | 89 | y | 121 | ~ | 126 | ? | 63 | | |
| 25 | Z | 90 | z | 122 | Pad | | HT | 9 | | |
| 26 | SP | 32 | SP | 32 | SP | 32 | LF | 10 | | |
| 27 | LL | | US | | LL | | VT | 11 | | |
| 28 | SL | | SL | | UL | | CR | 13 | | |
| 29 | PS | | PS | | PS | | [ | 91 | | |
| 30 | DL | | DL | | PL | | ] | 93 | | |
| 31 | BS | | BS | | BS | | UL | | | |

FIG. 5

| #Layers | Size (in x) | Capacity | #Layers | Size (in x) | Capacity | #Layers | Size (in x) | Capacity | #Layers | Size (in x) | Capacity |
|---|---|---|---|---|---|---|---|---|---|---|---|
| 1 | 19x19 | 12 | 9 | 53x53 | 230 | 17 | 87x87 | 652 | 25 | 121x121 | 1280 |
| 2 | 23x23 | 18 | 10 | 57x57 | 272 | 18 | 91x91 | 720 | 26 | 125x125 | 1372 |
| 3 | 27x27 | 48 | 11 | 61x61 | 316 | 19 | 95x95 | 790 | 27 | 131x131 | 1468 |
| 4 | 31x31 | 70 | 12 | 67x67 | 364 | 20 | 101x101 | 864 | 28 | 135x135 | 1568 |
| 5 | 37x37 | 96 | 13 | 71x71 | 416 | 21 | 105x105 | 940 | 29 | 139x139 | 1670 |
| 6 | 41x41 | 124 | 14 | 75x75 | 470 | 22 | 109x109 | 1020 | 30 | 143x143 | 1776 |
| 7 | 45x45 | 156 | 15 | 79x79 | 528 | 23 | 113x113 | 1104 | 31 | 147x147 | 1884 |
| 8 | 49x49 | 192 | 16 | 83x83 | 588 | 24 | 117x117 | 1190 | 32 | 151x151 | 1996 |

FIG. 6

FIG. 7A Source Encoding for the Message "Pi = 3.14":

| "ASCII Character" or Operation | Value from Table in FIG. 5 | Corresponding Binary Bits |
|---|---|---|
| P | 15 | 01111 |
| Lower Latch | 27 | 11011 |
| i | 8 | 01000 |
| space | 26 | 11010 |
| Punct. Shift | 29 | 11101 |
| = | 22 | 10110 |
| space | 26 | 11010 |
| Digit Latch | 30 | 11110 |
| 3 | 3 | 0011 |
| . | 12 | 1100 |
| 1 | 1 | 0001 |
| 4 | 4 | 0100 |

FIG. 7B Entire Message Binary String:
01111+11011+01000+11010+11101+10110+11010+11110+0011+1100+0001+0100

FIG. 7C Corresponding Message Data Blocks:

| Binary Pattern | | Hexadecimal Value |
|---|---|---|
| [0111111011] | => | 1FB |
| [0100011010] | => | 11A |
| [1110110110] | => | 3B6 |
| [1101011110] | => | 35E |
| [0011110000] | => | 0F0 |
| [0101001111] | => | 14F |

FIG. 7D Additional Calculated Reed-Solomon Check Data Blocks:

| [1110000101] | <= | 385 |
|---|---|---|
| [1111111011] | <= | 3FB |
| [0000101010] | <= | 02A |
| [0010001110] | <= | 08E |
| [1000010010] | <= | 212 |
| [0110011011] | <= | 19B |

FIG. 7E Graphical Sequence of Data Blocks:

FIG. 7F Resulting Symbol:

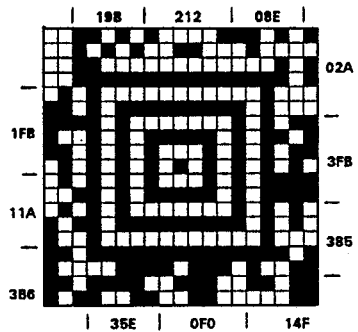

TWO DIMENSIONAL DATA ENCODING STRUCTURE AND SYMBOLOGY FOR USE WITH OPTICAL READERS

BACKGROUND OF THE INVENTION

The present invention relates to a bar code symbology which presents data in a two dimensional (2D) grid pattern or matrix, and is directed more particularly to a 2D matrix symbology in which data blocks are concatenated in a sequentially readable spiral-like pattern having a beginning and end which can be identified quickly and uniquely with respect to a centrally located finder pattern.

Bar code symbols have become a widely used way of identifying products which are being transported, priced, sorted, etc. Such symbols have the advantage that they may be read by any of a variety of bar code readers at high speed and with high accuracy. Provided only that the reader is able to read and decode data in the form in which it is encoded in the symbol, it is able to read that data at a speed and with an accuracy which greatly exceeds that of any human reader. This not only increases the productivity of the humans who work with the readers, it also improves the quality of the work environment by eliminating one of the most tedious and repetitive tasks performed therein.

With the increased acceptance that resulted from its early successes, the use of bar codes and bar code readers has expanded into an ever widening range of applications, including many for which they were not originally designed. Many of these applications call for the reading of bar code symbols which encode more data than is practicable with early one-dimensional (1D) bar code symbologies. As a result, new 1D symbologies were developed which increased the density with which data may be encoded. Examples of the resulting symbologies now include Code 128 and Code 49, among many others. An example of a symbology which includes a plurality of rows of encoded data, commonly known as a "1D-stacked" symbology, is described in U.S. Pat. No. 4,794,239 (Allais).

As the use of bar code symbols and bar code readers continues to expand, all of the above mentioned 1D symbologies eventually become unable to encode the amounts of data required, and in the space available. As a result, two dimensional (2D) matrix symbologies have been developed which are capable of storing a quantity of data that is substantially larger than is possible with 1D symbologies of any reasonable size. Examples of 2D symbologies are described in U.S. Pat. No. 4,634,850 (Pierce et al), U.S. Pat. No. 4,924,078 (Sant' Anselmo et al), U.S. Pat. No. 4,488,679 (Bockholt et al) and U.S. Pat. No. 5,329,107 (Priddy et al). These 2D matrix codes have the added advantage of being readable when scanned in any orientation.

In spite of the advantage of greatly increased data densities, 2D bar code symbologies have not come into widespread use. This is because many of the 2D symbologies which have been developed to date present reading and/or decoding difficulties which limit the speed and/or accuracy with which data may be read therefrom. One of these difficulties is the maintenance of a satisfactory level of illumination over the 2D image field that contains the bar code symbol. Another is that the accuracy with which a 2D symbol may be read is sensitive to the orientation of the symbol at the time it is read. Moreover, these two difficulties interact in a way that compounds the difficulties of either acting alone. A symbol that is tilted in relation to the plane in which it is to be read, for example, will not be uniformly illuminated by an illumination system designed to illuminate the symbol from a direction perpendicular to that plane. The tilting of the symbol also has the effect of foreshortening the image of the symbol in one or more planes which cannot be identified in advance. The 2D symbol may also have any one of many different angular orientations with respect to the axis along which it is illuminated. Other factors, such as the curvature of the surface on which the symbol appears, also have an effect.

Prior to the present invention, many attempts have been made to devise 2D symbologies which are relatively insensitive to the above-mentioned effects and/or to develop 2D bar code readers which are sophisticated enough to correct for them. An example of an attempt to make use of both of these approaches to achieve a high degree of accuracy is described in U.S. Pat. No. 4,896,029 (Chandler et al), which is hereby expressly incorporated herein by reference. While approaches such as that described in the latter patent achieve a certain measure of success, they require the utilization of such sophisticated software that a read operation cannot be performed by available microprocessors at a reasonable cost within a reasonable amount of time. Thus a need exists for a 2D symbology that allows data to be read accurately by microprocessors in a relatively short time and at a reasonable cost.

SUMMARY OF THE INVENTION

In accordance with the present invention there is provided an improved 2D bar code symbology and data structure which allows densely packed 2D data to be read accurately with computer circuitry which is relatively inexpensive and which is able to produce usable data within a relatively short time.

Generally speaking, the present invention comprises a new and powerful 2D matrix symbology which simplifies the tasks of finding the symbol in an image, determining the orientation of the symbol, determining the location at which encoded data begins, and providing a frame of reference that allows message data to be read therefrom sequentially in accordance with a set of instructions that may be executed rapidly by even relatively inexpensive microprocessors. As a result, once the microprocessor has acquired an image of a symbol and oriented itself with reference to that image, it may read data from the symbol with almost the same ease and rapidity as it could read data from a 1D bar code.

In the preferred embodiment the symbology of the invention includes a finder structure and a symbol descriptor structure which together lie at and form the core of the bar code symbol. By virtue of its simple geometry and easy recognizability, the finder structure allows the read circuitry to determine both the center of the bar code symbol and the axes of orientation thereof with respect to the reader. By virtue of its encoded data content the symbol descriptor structure allows the reader to determine the size of the symbol (in data space) and the length of the message encoded therein. Also included within the core of the symbology of the invention is an orientation structure including a set of orientation blocks that contain codes which indicate, with respect to the finder structure, where the data encoded in the symbol begins. Thus the finder structure comprises a framework which contains within itself all of the data necessary to characterize the beginning point and length of the message encoded within the bar code symbol.

The symbology of the invention also includes a reference structure which, in the preferred embodiment, comprises an easily recognizable grid that includes a plurality of linear arrays of reference elements having longitudinal axes that are oriented in parallel with one or more segments of the finder structure. The parts of this reference grid extend from within the finder structure to the outermost boundaries of the bar code symbol and provide a Cartesian frame of reference that allows the location of any part of the symbol to be accurately located with respect to the finder structure, thereby greatly increasing the chances of that part being accurately read. In the preferred embodiment this grid is expanded to include linear segments, not included in a Cartesian frame of reference, that subdivide or partition the symbol into smaller units. The intersections of these additional linear segments serve as the origins of secondary frames of reference which, by virtue of their known locations with respect to the finder structure, allow the outer parts of the symbol to be located with the same accuracy as those parts of the symbol that are nearer to the finder structure. As a result, the accuracy with which data may be read from the symbol is made independent of the quantity of data encoded therein.

The symbology of the present invention also includes a data structure that includes a plurality of data blocks which are organized into a string having one end that is located in a predetermined position with respect to the core structure. All message data, and all check or error correction data is encoded as combinations of black and white squares (1's and 0's respectively) that are positioned within these data blocks. Each of these data blocks, in turn, includes a plurality of component blocks, hereinafter referred to as "dominoes", which allow the spatial or directional continuity of the data blocks to be interrupted without disrupting the ability of a bar code reader to accurately read all of the data encoded therein. It is the elimination of the need for such continuity that allows the data blocks to be formed into layers which wrap around and enclose the core structure and yet which may be read sequentially within each layer. The elimination of the need for such continuity also allows a reader to move easily from one layer to the next to continue reading a message that extends across the boundary between layers. In this way, the symbology of the present invention allows data to be read from the symbol sequentially by following a simple spiral-shaped read path therethrough. With this structure, it is possible to read the encoded data using a single simple software routine over and over again, thereby increasing the speed of the reading process as a whole. Thus, the symbology of the invention provides both the ease of reading that is characteristic of sequentially organized data and the high data densities that are characteristic of 2D matrix symbologies.

One particularly desirable feature of the symbology of the invention is the manner in which the above described features cooperate and interact to produce a result which represents a significant improvement over previously available 2D bar code symbologies. The above-mentioned orienting structure, for example, makes it possible for the reader to quickly locate one end of the string of data blocks with respect to the finder and reference structures, thereby enabling the reader to more quickly begin a reading process that itself proceeds more quickly than that of previously known 2D symbologies. Similarly, the above-mentioned symbol descriptor structure makes it possible for the reader to know in advance how many data blocks contain message data, thereby enabling the reader to know where message data ends and, check or error correction data begins. This, in turn, allows the reader to more quickly and accurately complete the task of generating finished, error-corrected data. Significantly, the symbol descriptor structure of the invention does not restrict the number of check data blocks that are included in the symbol. The latter number is at a minimum equal to the difference between the total number of data blocks in the symbol and the number of data blocks which contain message data. If a user wants a higher degree of error correction than is possible with this minimum number, he can provide it by simply increasing the number of layers in the symbol and using the data blocks thereof to encode additional check data. Thus, the symbology of the invention is a versatile symbology and supports a wide range of user selectable levels of error correction.

Other objects and advantages of the invention will be apparent from the following description and drawings which follow.

DESCRIPTION OF THE DRAWINGS

FIG. 3 is a version of FIG. 2 which shows the structure of the layers within which data is entered into the bar code symbol of the invention;

FIG. 4 is an enlarged fragmentary view of a bar code symbol which shows how data blocks are packed therein;

FIG. 4A shows the structure of one of the data blocks used by the bar code symbol of the invention;

FIG. 5 is a table showing the source coding scheme used to encode data in accordance with the invention;

FIG. 6 is a table showing the relationship between the number of layers in the bar code symbol of the invention and the data capacity thereof; and FIGS. 7A through 7F illustrate the manner in which data is encoded in accordance with the invention, including a representation of the resulting bar code symbol.

DESCRIPTION OF THE PREFERRED EMBODIMENTS

Figure 1:
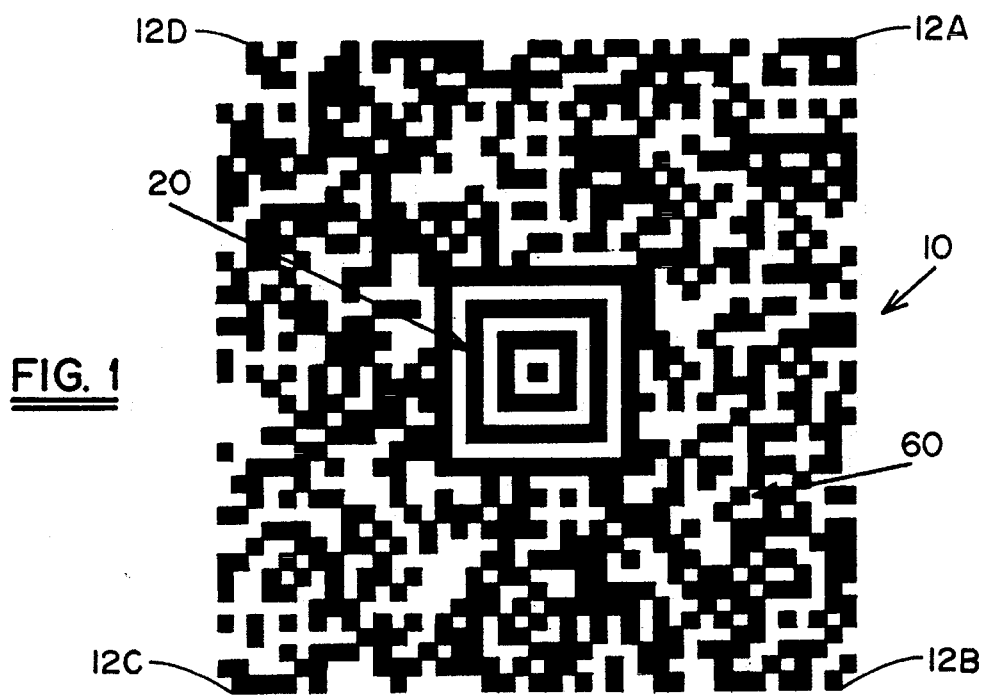
FIG. 1 is an enlarged view of a typical bar code symbol which makes use of the symbology of the present invention.

Referring to FIG. 1 there is shown a representative example of a two dimensional (2D) bar code symbol 10 which makes use of the symbology of the present invention. Bar code symbol 10 has a nominally square shape and is located entirely within a square space 12 (the boundary of which is shown in dotted lines in FIG. 2) having corners 12A through 12D. Unlike other 2D bar code symbols such as Data Matrix, for example, bar code symbol 10 has no printed lines or other patterns along any of its outer edges or corners other than such marks that form a part of an encoded message. Such lines or other marks are used by some 2D symbologies as finder structures, but are not used by the symbology of the invention. Instead, the symbology of the invention uses a centrally located finder structure 20, most clearly shown in FIGS. 2 and 3, having the same overall shape as symbol 10. This finder structure is surrounded by data structure or field 60 within which message and other data is encoded in accordance with a coding scheme to be described later in connection with FIG. 5. It will be understood that the appearance of symbol 10 depends on the data encoded therein. As a result, a symbol which contains the same amount of data as symbol 10, but which has a different data content, will have an appearance which is different from that of symbol 10. It will, however, have the same general appearance as the symbol shown in FIG. 1, and will be contained within a nominally square space such as that shown in dotted lines in FIG. 2.

The term "structure" will be used herein with reference to the various parts of the symbology of the invention and bar code symbols which make use thereof. As used herein this term will be understood to mean an ordered framework within which information may be stored according to clearly defined rules and from which that information may be extracted for use in determining the content of the message that is encoded in the bar code symbol. In the case of a printed bar code symbol, the term "structure" refers to an ordered set of physical locations, in which information necessary to mad the symbol is stored as a pattern of black or white squares of identical size. In the case of a bar cede symbol which has been read and stored in a memory, the term "structure" refers to an ordered set of memory locations in which information is stored as a pattern of electrical signals representing 1's and 0's. To the extent that a read operation is correct, there will be a one-to-one correspondence between the elements of these two representations of the symbol, each structure of a printed symbol having an existence in physical space and each structure of an electrically stored symbol having an existence in memory or data space. Because of the exact correspondence of these representations, the term "structure" may refer to either of these forms of representation, depending on the context.

Figure 2:
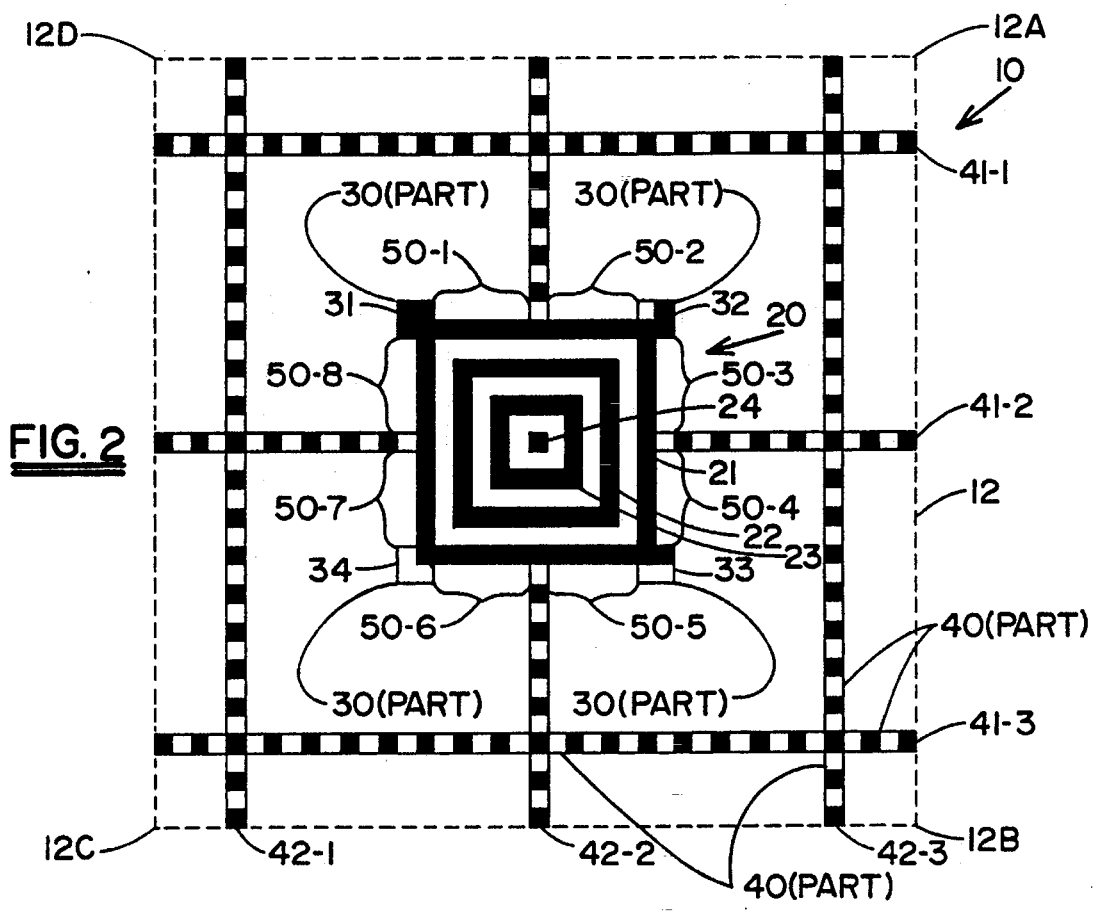
FIG. 2 is an enlarged view of the bar code symbol of FIG. 1 shown as it would appear if all message and error correction data were deleted therefrom.

Referring to FIG. 2, there is shown a bar code symbol from which all message and check or error correction data has been eliminated, i.e., a bar cede symbol which has been emptied of all variable data to show the structures used therein. In the embodiment of FIG. 2 these structures include a finder structure 20, an orienting structure 30, a reference structure 40, and a symbol descriptor structure 50, all of which have multiple parts. In the preferred embodiment, finder structure 20 includes three black finder squares 21, 22, and 23, which are nested one within the other and have centers that substantially coincide with a square 24 that is positioned at the center of the symbol. These black finder squares are separated by white spaces that serve as white finder squares, although they are not numbered. Together the black and white squares of finder structure 20 comprise an easily recognized indication of the center of symbol 10. Since the sides of these finder squares are parallel to one or the other of the major axes of the symbol, finder structure 20 also comprises an easily recognized indication of the position, scale and orientations of the major axes of symbol 10.

While finder 20 serves as a clear indicator of the center of the symbol and of its axes, it's high symmetry prevents it from being used to indicate the location of data structure 60. As a result, the circuitry whose task it is to read the stored version of symbol 10 does not know the memory location from which to begin reading encoded data. To the end that this information may be provided, the symbology of the invention includes an orienting structure 30 which includes four L-shaped blocks 31 through 34 which are positioned at respective corners of finder structure 20, and which allow those corners to be uniquely identified. Block 31, for example, includes three black squares and is used to indicate one end of the data stream. Blocks 32, 33, and 34 each include two, one or no black squares, respectively, and indicate the corners of finder 20 which follow block 31 in the clockwise direction. The manner in which block 31 indicates the location of the beginning of data field 60 will be described presently in connection with FIG. 3. In addition to uniquely identifying one end of the data field, orienting blocks 31 through 34 can also be used to determine the angular orientation of symbol 10 as a whole with respect to the reader used to read it. These four orienting blocks can also indicate whether the symbol is being viewed in mirror image form.

In accordance with an important feature of the present invention the symbol locations which lie in the first tier or one square thick set of locations surrounding finder 20 comprise a symbol descriptor structure 50 that encodes data regarding the size of the symbol and the length of the message contained therein. Because of the presence of orienting blocks 30, symbol descriptor 50 is divided into eight fields 50-1 through 50-8 each of which is five bits long, making a total of 40 bits available to describe symbol 10. In the preferred embodiment, the first five of these bits (extending in the clockwise direction from orienting block 31 within field 50-1) give the total number of layers of data included in the symbol, minus 1. As will be explained more fully in connection with FIGS. 3 and 4, the number of such layers is equal to the number of layers of 2-bit by 5-bit data blocks which may be fitted between finder 20 and the outer edge of the symbol. This number will ordinarily be a number from 1 to 32, depending upon the amount of information encoded within by the symbol. In the exemplary embodiment of FIG. 2, the number of such layers is six, as is most clearly shown in FIG. 3.

The next 11 bits of the symbol descriptor, which are located in fields 50-2, 50-3 and a part of field 50-4, specify the number of message data blocks that are included in the symbol, minus 1. This number generally will be small for symbols encoding short messages, i.e., symbols having a small number of layers, and will be large symbols encoding long messages, i.e., symbols having a large number of layers. The relationship between the number of layers and the maximum number of data blocks (both message and check) that can be positioned therein is shown under the heading "capacity" in the table of FIG. 6. The number of such message data blocks will always be less than the total number of 2×5 bit data blocks which can be fitted into the data field of the symbol. This is because many 2×5 blocks are used to encode error correction or check data rather than message data. A typical value for the proportion of check data blocks to the total number of data blocks in the symbol is 25%, although the actual percentage will vary somewhat from message to message even for a symbol of a given size. The general relationship between the numbers of the various types of blocks in the symbol may be given as: N=D+C, where N is the total number of 2×5 blocks which may be fitted into the data field of the symbol, i.e., the capacity, D is the number of data blocks that contain message data, and C is the number of data blocks that contain check or error correction data. From this relationship it will be seen that the more compactly message data may be encoded into data blocks, the more data blocks will be left over for error correction data, a condition which is desirable because of the improvement in read accuracy which such additional error correction makes possible.

The fact that the symbol descriptor specifies the number of layers and the number of message data blocks has significant advantages. Previous symbologies specify the number of check data units not the number of message data units. As a result, "pads" or empty data units must be added to the message field to fill out the symbol. With the symbology of the invention, such pads are eliminated and the additional space is used for additional check data blocks, thereby increasing the level of error correction. In addition, the fact that the symbol descriptor encodes the number of layers independently from the number of message data blocks allows entire layers of check data blocks to be added to the symbol without changing the number of message data blocks thereof, still further increasing the level of error correction. It will therefore be seen that the symbology of the invention is an versatile symbology and supports a wide range of user selectable levels of error correction.

The remaining 24 bits of the symbol descriptor structure contain check characters calculated by systematic Reed-Solomon encoding using the Galois Field GF(16) with a prime modulus polynomial of $x^4+x+1$. The generator polynomial $(x-2^1)\ldots(x-2^6)$ is $x^6+7x^5+9x^4+3x^3+12x^2+10x+12$. Such a high percentage of error correction is desirable because of the vital role played by the 16 symbol descriptor bits in the decoding of message data. Specifically, since the total number of data blocks in the symbol (N) is implicit from the number layers encoded in the first 5 bits, and since the total number of message data blocks (D) is directly encoded in the next 11 bits, then the exact number of check data blocks in the symbol (C) is also known. These numbers are vitally important in a symbology, such as that of the present invention, in which message data blocks are concatenated with the check data blocks and read sequentially because the reader of the symbol must know exactly where to switch between regarding raw data as the message and regarding raw data as checks. In accordance with the present invention the significance of this information is recognized by including the symbol descriptor near the center of the symbol where it is less likely to be damaged as a result of physical abuse to the symbol than if it were located at the periphery thereof. This significance is also recognized by locating the symbol descriptor adjacent to finder 20 where the locations of its component bits may be determined more accurately than more peripherally located bits.

While all symbologies employing Reed-Solomon error control encoding must in some way encode the number of message and check blocks, and while some resort to just a fixed symbol size and/or fixed percentage or checking, the symbol descriptor structure of the present invention completely decouples the symbol size from the amount of error correction and thereby offers unusual flexibility and novel message robustness. To be sure the message which is to be encoded absolutely determines the number of message data blocks needed, but the user is then free to choose any symbol size whose capacity can hold that message plus a minimum allotment of check blocks, and potentially even a much larger size which then would fill up with a high percentage of check data blocks. Typically a user specifies that a particular number or percentage of check blocks be added to each symbol, but where the number of message blocks plus check blocks do not completely fill out the symbol, then extra check blocks are added providing extra error correction capability. All other known 2D symbologies pad the message instead, providing no extra capability. Occasionally applications arise where the user specifies a fixed size for the symbol that can hold all the possible messages planned. In this latter case, those symbols which encode less than the maximum message also will benefit from having extra check blocks added, not message pads, thus providing extra error correction capability.

In view of the foregoing, it will be seen that finder structure 20, orienting structure 30 and symbol descriptor 50 together indicate the location of the beginning of the data field, the size of the symbol (in layers), the number of data blocks included in the message, and the location of the boundary between message data and check data, or vice versa, depending which is read first and in which direction. It will also be seen that, once the symbol descriptor structure has been loaded with descriptor data, it together with finder structure 20 and orienting structure 30 form a complete square centered on center square 24. For the sake of convenience this multi-structure square will hereinafter be referred to as the core structure or core of the symbol.

To the end that encoded data may be read with acceptable accuracy from those parts of symbol 10 which are relatively distant from the core of the symbol as well as from those parts of the symbol which are relatively close to that core, the symbology of the invention includes a reference structure which is centered on the center of symbol 10. In the preferred embodiment this reference structure includes a reference grid 40 which includes a plurality of grid segments made up of alternating white and black reference elements. In the six layer symbol of FIG. 2, grid 40 includes three horizontally oriented grid segments 41-1, 41-2, and 41-3 and three vertically oriented grid segments 42-1, 42-2, and 42-3, each horizontal grid segment being perpendicular to each vertical grid segment. Two of these grid segments, 41-2 and 42-2 intersect at center square 24 of the symbol. (The line segments of finder 20, by coinciding with the innermost elements of grid segments 41-2 and 42-2, obscure the fact that these segments extend both to and through finder 20). While these central grid segments can in principle be used to locate data elements in any part of the symbol, it has been found that the use of additional, auxiliary grid segments such as 41-1 and 41-3 increases the speed and accuracy with which the more peripherally located elements can be located with reference to the center of the symbol. This is because each intersecting pair of the auxiliary grid segments act as an auxiliary origin with respect to which a peripherally located data element may be quickly located and whose own location with respect to the center of the symbol is known with a high degree of accuracy.

The benefits of using auxiliary grid segments increase in proportion to the number of layers that a symbol has. As a result, if a symbol has many more layers than the six used in the symbol of FIG. 2, even the six grid segments shown in the latter may be inadequate. Accordingly, the symbology of the invention provides for as many auxiliary grid segments as may be necessary to achieve both a rapid read rate and a high degree of accuracy. In the preferred embodiment this is accomplished by using grid segments which are evenly spaced throughout the symbol, each grid segment being located 16 distance units (squares) away from the nearest parallel grid segment in both the horizontal and vertical directions. This results in the creation of a plurality of data fields each of which is 15 data elements in length in both the horizontal and vertical directions, except in those parts of the symbol in which the reference grid is adjacent to either the finder structure or the outer edges of the symbol. With the use of this spacing, no data element (black or white square) in the entire symbol can be located more than eight vertical or horizontal squares from the nearest intersection of the reference grid. As will be explained more fully presently, data elements are not allowed to coincide with any of the elements of the reference grid, and must instead be located on one or the other side thereof. This assures that all parts of the reference grid are usable for any purpose at any time.

The manner in which data is entered into the data field of the symbol shown in FIG. 2 will now be described with reference to FIGS. 3, 4 and 4A. Referring first to FIG. 4A, there is shown the structure of what is referred to herein as a "data block". By "data block" is meant the working unit into which data elements are organized prior to being positioned within the data field of the symbol. In the preferred embodiment shown in FIG. 4A, the data block is indicated by the numeral 60 and includes a rectangular array which is 2 bits high and 5 bits long. Data to be entered into this array will be in formed into a binary string based on the encoding scheme shown in FIG. 5. After being organized into this string, the binary data is entered into the locations of the block according to the numbering scheme shown in FIG. 4A, a black square representing a "1" and a white square representing a "0". Under this numbering scheme, the most significant bit of the binary string is entered in location 1, the next most significant bit in location 2, and so on. Each time that 10 bits has been entered, the numbering sequence is restarted with the number "1". The boundaries of the data block may or may not coincide with the binary boundaries of a message character, i.e., a character may "spill over" from one data block to the next.

In general each 10-bit block will hold 10 bits of the binary message string, but in two exceptions they hold only 9 bits of message. If the first 9 message bits inserted into a block are all "0"s, then the 10th (and least significant) bit in that block is automatically set to a "1" and the next message bit starts off the next block instead. Similarly, if the first 9 message bits in any block are all "1"s, then the 10th (and least significant) bit in that block is automatically set to a "0" and the next message bit starts off the next block instead. These two special cases, which on average will occur 1/256th of the time, eliminate the possibility that any valid message data block can be all "0"s or all "1"s, and eliminating that possibility substantially enhances a reader's ability to detect and correct the most probable data block errors that may occur to a symbol.

When the entire string of message bits has been laid into 10-bit blocks, then the final block, if not yet completely full, is filled out with "1"s, except that if its first 9 bits are all "1"s then the 10th bit is made a "0". In this manner, a given message bit string fills D message data blocks. To this sequence of message blocks are then appended C check data blocks where D+C blocks are exactly one of the symbol capacities given in the table of FIG. 6. The check blocks are calculated by systematic Reed-Solomon encoding using the Galois Field GF(1024) with a prime modulus polynomial of $x^{10}+x^3+1$. The generator polynomial $(x-2^1) \ldots (x-2^C)$ is calculated for each symbol depending on its particular value of C. Because error correction calculations of this type are well known to those skilled in the art, the structure and operation thereof will not be described in detail herein.

Once all the message data blocks have been assembled and the check data blocks have been calculated, then the full string of blocks is joined together in end-to-end-relationship and entered into the data structure of symbol 10 according to the packing scheme illustrated in FIGS. 3 and 4. As is best shown in FIG. 4, this is accomplished by entering the data blocks sequentially in layers that are adjacent to and surround the core structure of the symbol, beginning at the upper outer corner of orienting block 31. For the sake of clarity, the data block in this first position is shown as having the same number (60) which was used therefor in FIG. 4A. The end of the next data block 62 in the string is then positioned at the end of data block 60 at the next available position within the first (horizontal) segment 70-1 of first or innermost layer 70 of the data structure, as shown in FIG. 4. It will be noted part of data block 62 falls on one side of segment 42-2 of reference grid 40 while the rest of block 62 falls on the opposite side thereof. This partitioning of data block 62 is necessitated by the fact that no part of a data block may coincide with the reference grid. This partitioning of data block 62 has no adverse effect on the reading of data therefrom since both the encoding and decoding schemes specifically contemplate and make provision for such discontinuities (among others to be discussed later) within or between data blocks.

In accordance with an important feature of the present invention, this provision takes the form of each data block being organized as an assemblage of five 1×2 bit sub-blocks, hereinafter referred to as "dominoes", which are ordinarily joined in side-by-side relationship within a data block, but which may assume other relationships where necessary to accommodate constraints imposed by the shape of the symbol. In FIG. 4A, for example, the dominoes which make up data block 60 are bounded by the vertical dotted lines and the upper and lower halves of the dominoes are indicated by horizontal dotted lines. Thus, the dotted blocks including the numbers 1 and 2 comprise one domino, the dotted blocks containing the numbers 3 and 4 comprise a second domino, and so on. In accommodating the geometry of the data structure of the symbol, the sides of these dominoes may be separated, as in the case of data block 62, to make room for a part of the reference grid. These dominoes may also be rotated through 90 degrees of arc with respect to one another to allow layers of data blocks to turn corners, as shown by the data block at the upper left corner of FIG. 4, the turning of such corners being possible either between data blocks or within a data block. Finally, for reasons which will be discussed more fully later, the upper and lower halves of the dominoes may be separated in order to prevent any part of a data block from coinciding with any part of the reference grid.

Provided only that the rules for handling the above-discussed discontinuities are defined unambiguously for both encoding and decoding purposes, there is no theoretical limit to their number; they are in all cases as numerous as necessary to allow data to be tightly packed within the symbol without interfering with the ability of the bar code reader to reconstruct and decode the original string of data blocks. One such rule is that, in making turns, each domino is oriented so that the less significant of its bits is positioned closer to the finder than the more significant bit thereof.

The overall scheme that is used to pack data blocks into a symbol according to the symbology of the invention is most clearly shown in FIG. 3, which shows the boundaries of the layers of data blocks in solid lines, even though such solid lines do not appear in the printed form of the symbol. In FIG. 3 it will be seen that innermost layer 70 of data structure 30 includes four overlapping layer segments 70-1, 70-2, 70-3, and 70-4 which are perpendicular to one another and which together have a spiral-like form that encloses both the first layer and the core structure of the symbol. Similarly, the next innermost layer of data blocks 72 includes four overlapping layer segments 72-1, 72-2, 72-3, and 72-4 which are perpendicular to one another and which also have a spiral-like form that encloses the core structure of the symbol. In second layer 72, however, the beginning of the layer is aligned with the end of first layer 70 and has a read direction which is rotated 90 degrees with respect thereto, as shown in FIG. 4. As a result, second layer 72 may be regarded as a spiral-like continuation of first layer 70. This pattern of concatenated spiral-like layers continues through the third, fourth, etc. layers of the data structure until it terminates at a corner of the outermost layer thereof. Because of this spiral-like continuity, data may be read out of the symbol in a sequential manner by reading the data blocks along a spiral-like path that wraps many times around the core structure of the symbol. Thus, the symbology of the invention allows a 2D symbol to be read as easily as if it were organized as a linear string or sequence of data blocks.

In interpreting FIGS. 3 and 4, it should be observed that the turns which take place within a layer are different from the turns that take place at the end of a layer, i.e., in conjunction with a transition between layers. When a layer turns a corner within a layer, the sides of the dominoes that follow the corner are adjacent to the bottoms of the dominoes that precede the corner. When a turn takes place in conjunction with a change of layer the bottoms of the dominoes that follow the corner are adjacent to the sides of the dominoes that precede the corner. Since the latter corners are always associated with the beginning of a new layer, the corner at the beginning of a new layer, will be seen to differ from the three remaining corners of that layer. In FIG. 3 these transitional corners extend upwardly and leftwardly from orienting block 31 along a diagonal of the symbol.

Although the illustrated symbols have too few layers to show it, the 12th and 27th layers of a symbol differ from those of the remaining layers. This is because, as previously explained, the data fields between the segments of the reference grid are 15 units in length. As a result it is not possible to pack a whole number of layers of 2×5 bit data blocks in the data fields that lie outwardly of the four (L-shaped) data fields that are adjacent to finder 20. This problem manifests itself in layers 12 and 27 and is dealt with by locating one half of each affected data block on the outer side of the reference grid segments that are located there and the other half of each affected data block on the inner side of that grid segment. This "horizontal splitting" of the data blocks creates no problems because it is taken into account in both the encoding and decoding of data in much the same way as the previously described vertical splitting of data blocks.

Because 2D symbols are read as a whole by forming an image thereof on a suitable 2D array of light responsive elements, the above-described sequential read path should not be interpreted as meaning that the printed symbol is illuminated by a light beam that is moved along a spiral-like path through the printed symbol. Instead, the sequential read path should be interpreted as applying to the sequence of addresses used by the reader circuitry to read data out of an electrical representation of the bar code symbol that is stored in the memory of the reader as a result of the action of the image of the printed symbol on the light-responsive array. This is possible because, as previously explained, there is a one-to-one correspondence between the elements of the optical and electronic representations of the bar code symbol. Thus, the term "path" or "sequence" may refer either to a physical path or sequence in physical space, or to an electrical path or sequence in memory space, depending upon the representation being used.

As previously explained, the data stored in the data space of the symbology of the invention is of two kinds, message data and check data (also known as "checkwords") that are joined together into a string of data blocks and read out in a sequence. It will be obvious that the order and direction in which the string is first printed and then read is not fundamentally important so long as that order and direction are used and interpreted consistently. With all such data stored in memory, the apparent differences between such directions merely reflect whether successive addresses are generated by incrementing or decrementing earlier addresses.

At the same time, damage to a symbol and inaccurate imaging are most likely to occur towards its periphery, so some benefit is derived from locating the most correctable data blocks in the outermost layers. In the preferred embodiment, the message data blocks were generated precluding any block of all "0"s or all "1"s, but the calculated check data blocks do not follow that exclusion, thus making certain types of error within the message portion of the data more easily detectable. For this reason, the string of data blocks are inserted into the symbol in what may seem to be reverse order: the final check block is located adjacent to orienting block 31 as shown in FIG. 4 (as data block 60), the next-to-final check word is data block 62, and so forth spiraling outward until the first message data block just fills up the outmost layer of data. Because information in the symbol descriptor precisely locates where the check blocks end and message blocks begin, the reader will know at a certain point to start regarding blocks of all "0"s or "1"s in the outer layers as "erasures" in the error-correcting sense (i.e., known error locations), improving the error correction efficiency of the read operation in accordance to well-known decoding techniques. Typical errors such as torn or obliterated edges or corners on a symbol, or edges or corners falling outside the scanned image field, are most efficiently handled in this manner.

The data encoding scheme that is preferred for use with the symbology of the invention will now be described with reference to the coding table shown in FIG. 5. Referring to FIG. 5 it will be seen that the coding table includes a first, leftmost column labelled "Value" which contains the 32 different numbers which can be specified by the maximum of five bits which each data block makes available for the identification of a single character. The second column of the table, labelled "UPPER", lists in its left half the 26 upper case alphabetic characters that correspond to the first 26 entries of the Value column, together with the six space, latch and shift characters which correspond to the last six entries in the Value column. The right half of the second column shows the ASCII codes for the characters shown adjacent thereto. According to the default scheme of the illustrated code, the character which will be specified by the maximum of 5 bits set aside therefor will be one of the upper case characters (including SP=space) shown in column UPPER, unless one of the last five entries is indicated. If one of the latter entries is indicated, the scheme is directed to one of the remaining columns of the table as follows: the indication of LL, meaning latch lower, will cause subsequent code entries to the interpreted as the lower case alphabetic characters shown in column LOWER until a further code shift is called for. The indication of SL, meaning string latch, will cause the next code entry to be interpreted as the character shown in column STRING until a further code shift is called for. The indication PS, meaning punctuation shift, will cause the next character only to be interpreted as the character shown in column PUNC. The indication DL, meaning digit latch, will cause subsequent code entries to be interpreted as the numbers shown in column DIGIT until a further code shift is called for. Since the number of entries included under column DIGIT is 16 the entries thereof may be encoded with four rather than five bits. The indication BS, meaning byte shift, is a special case which will be discussed separately later.

Similar code shifts from column to column, either on a latched or a single character basis, occur as follows: US means shift to column UPPER for a single character, UL means shift to column UPPER on a latched basis, PL means shift to column PUNC. on a latched basis. Once operation in accordance with column PUNC. is initiated, it is possible for data read from the symbol to be interpreted as control characters rather than as alphanumeric data, e.g., LF meaning line feed, CR meaning carriage return, HT meaning horizontal tab, and VT meaning vertical tab. In addition, during operation in accordance with the first four codes shown for the STRING and PUNC. columns, certain commonly occurring combinations of codes are provided for, e.g., CR LF meaning carriage return plus line feed, ".SP" meaning a period followed by a space, etc. which require two separate codes under the ASCII coding scheme.

In view of the foregoing it will be seen that the fact that the alphabet uses five fewer characters than can be encoded by five bits is taken advantage of by the coding scheme of the symbology of the invention to create latched and unlatched code shifts between coding columns that, in turn, allows a character set of complexity comparable to ASCII to be realized with either four or five bit long strings of binary data. The reduced number of coding bits is responsible for the fact that two or more characters can be encoded into each of the above-described 2×5 bit data blocks. It is in this way that the symbology of the invention realizes the full potential of the high data packing densities made possible by 2D bar code symbols.

The above-described coding scheme and its use in organizing data into data blocks for inclusion in the symbology of the invention will be illustrated with the specific example shown in FIG. 7. In the latter example the message to be encoded is "Pi=3.14", a message which includes a total of 12 encodable parts that are shown one below the other in the leftmost column of FIG. 7A. Listed in the middle column of FIG. 7A are the values associated with each of these message elements in FIG. 5. The rightmost column of FIG. 7A includes the binary equivalents of the values shown in the middle column, with the least significant bits shown in the conventional manner at the right. FIG. 7B shows the binary numbers given in the rightmost column of FIG. 7A formed into a binary string. The left column of FIG. 7C shows the binary string of FIG. 7B formed into six 10 bit units suitable for formation into six message data blocks. In the last entry in FIG. 7C four pad bits have been added to bring the total number of bits up to 10. The right column of FIG. 7C gives the hexadecimal values which are derived from the 10 bit entries shown in the left column thereof. The right column of FIG. 7D shows six sets of hexadecimal numbers calculated according to the above-discussed Reed Solomon correction scheme. Six such sets are used because they give rise to six check data blocks which together with the six message data blocks, make up the 12 data blocks necessary to fill up the 12 data block capacity of a one layer symbol. The entries in the left column of FIG. 7D show the 10 bit units which are derived from the six sets of hexadecimal numbers shown in the right column thereof. FIG. 7E shows the 10 bit units listed in FIGS. 7C and 7D formed into a string of data blocks in which the check data blocks preceded the message data blocks. Finally, FIG. 7F shows the string of data blocks illustrated in FIG. 7E organized into a complete bar code symbol in accordance with the packing scheme of the present invention.

There will now be described the effect of the above-mentioned special binary shift command BS. With the occurrence of this command, the reader is instructed to discontinue reading the encoded data according to the above-described encoding scheme, i.e., without organizing data read from the data blocks into the four or five bit long binary strings called for in FIG. 5. Instead, the reader is instructed to read the five bits first following the BS command and, if they are non-zero, to regard them as the number of 8 bit literal bytes that follow. This is used when there are 1 to 31 bytes to be read. If these bits are zero, then the next 11 bits are to be regarded as encoding the number of literal 8 bit bytes that follow, less 31. This is to be used when thee are more than 31 bytes to be read. This binary shift command can be used to encode either isolated extended ASCII or control characters or long strings of byte data, possibly filling the entire remainder of the symbol. At the end of such a string of bytes, encoding will return to the point in the coding Table at which the byte shift was initiated.

While this invention has been explained with reference to the structure disclosed herein, it is not confined to the details set forth and this application is intended to cover any modifications and changes as may come within the scope of the following claims:

What is claimed is:

1. An optically readable two dimensional bar code symbol, comprising:

a finder structure including a center and a plurality of squares which have centers that approximately coincide with said center and which are disposed in nested relationship to one another, each of said squares having first and second major axes which are substantially perpendicular to one another and which pass approximately through said center;

a symbol descriptor structure encoding data indicating at least the overall symbol size and the length of the message encoded in said bar code symbol, said descriptor structure being located adjacent to said finder structure;

a reference structure comprising at least two linear arrays of reference elements, said linear arrays having respective longitudinal axes that are oriented parallel to at least one of said first and second major axes;

a data structure including a plurality of data blocks, said data blocks being concatenated to form layers that surround said finder structure;

whereby the data blocks of said layers may be read sequentially within each layer and said layers may be read sequentially until all data has been read from said symbol.

2. A bar code symbol as set forth in claim 1 in which said finder structure and said descriptor structure together define a core structure around which said layers are positioned in a spiral-like configuration with respect to said center.

3. A bar code symbol as set forth in claim 2 in which each of the layers of said data structure includes four adjacently disposed layer segments, each layer segment being oriented perpendicularly and in overlapping relationship with respect to the adjacent layer segments, whereby the layer segments of each layer of data together form a substantially closed structure surrounding said center.

4. A bar code symbol as set forth in claim 2 further including an orienting structure, included within said core structure with respect to which the location of the first data block to be read may be uniquely determined.

5. A bar code symbol as set forth in claim 4 in which said orienting structure includes orientation blocks located adjacent to said descriptor structure, and in which said descriptor structure and said orientation blocks together form a square layer which surrounds said finder structure.

6. The bar code symbol as set forth in claim 1 in which said symbol descriptor includes a plurality of check bits for use in correcting errors in descriptor data encoded therein.

7. A bar code symbol as set forth in claim 6 in which said symbol descriptor encodes the number of layers and the number of message data blocks included in the symbol.

8. A bar code symbol as set forth in claim 6 in which the message data blocks and the check data blocks are concatenated into respective strings of data blocks, in which said strings are concatenated with one another to form a combined string and in which said combined string is positioned in layers surrounding said core structure, said check data blocks being positioned closer to said core structure than the message data blocks of said combined string.

9. A bar code symbol as set forth in claim 1 in which each of said data blocks comprises a 2 unit by 5 unit array of data elements.

10. A bar code symbol as set forth in claim 9 in which each data block may be split as needed to move between layer segments or to prevent elements of that block from overlapping elements of said reference structure.

11. An optically readable two dimensional bar code label comprising:

finder cell including a plurality of rectilinear line segments which form a plurality of closed nested squares, said squares having centers which substantially coincide with one another and having sides which are perpendicular with one another;

a symbol descriptor containing data indicating at least the overall symbol size and the length of a message printed on said label, said symbol descriptor including optically readable marks which are organized into a descriptor field which is located adjacent to said finder;

a reference grid including a plurality of linear segments, each grid segment having a longitudinal axis that is parallel to a side of one of said squares;

a plurality of data blocks for encoding data for printing on said label, said data blocks being organized into a string of data blocks which are in turn organized into at least one layer that surrounds said symbol descriptor;

whereby said data blocks may be read sequentially within each layer and said layers may be read sequentially until all of the data encoded within said symbol has been read.

12. The bar code label of claim 11 in which each complete layer of data blocks includes four adjacent layer segments, each layer segment being oriented perpendicularly and in overlapping relationship with respect to the adjacent layer segments of the same layer, whereby the layer segments of each layer of message data blocks together form a square surrounding said center.

13. The bar code label of claim 11 in which some of said data blocks contain message data and some of said data blocks contain check data, and in which said check data blocks and said message data block are concatenated within respective parts of said string.

14. The bar code label of claim 13 in which the check data blocks of said string are positioned closer to said symbol descriptor than the message data blocks thereof.

15. The bar code label of claim 11 in which some of said data blocks comprise message data blocks that encode message data and the remainder of said data blocks comprise check data blocks that encode error correction data.

16. The bar code label of claim 15 in which said symbol descriptor encodes the number of layers and the number of message data blocks in said symbol.

17. The bar code label of claim 11 in which each of said data blocks comprises a 2 unit by 5 unit array of data elements.

18. The bar code label of claim 17 in which each of said data blocks may be split as needed to move between layer segments or to prevent elements of that block from overlapping elements of said reference grid.

19. The bar code label of claim 11 further including at least one orientation block having a predetermined location with respect to said finder cell for indicating the data block containing an end of said string.

20. An optically readable two dimensional bar code symbol comprising:

a finder for use in determining the center of said symbol;

a symbol descriptor for use in determining the maximum data capacity of said symbol and the quantity of message data encoded therein;

a reference grid for use in determining the position of any part of said symbol with reference to said center;

a linear array of data blocks including a plurality of message data blocks and a plurality of check data blocks, the number of message data blocks being just sufficient to encode said quantity of message data, and the number of check data blocks being fixed by the difference between said maximum data capacity and said just sufficient number of message data blocks;

a data field within which said linear array of data blocks may be densely packed without overlapping any of said finder, said symbol descriptor and said reference grid.

\* \* \* \* \*

Dedication 5,591,956—Andrew Longracre, Jr., Skaneateles; Rob Hussey, Liverpool, both of N.Y. TWO DIMENSIONAL DATA ENCODING STRUCTURE AND SYMBOLOGY FOR USE WITH OPTICAL READERS. Patent dated Jan. 7, 1997. Dedication filed March 20, 1997, by the assignee, Welch Allyn, Inc.

Hereby dedicates to the public the entire term of said patent.
*(Official Gazette, June 17, 1997)*